Patented Aug. 6, 1935

2,010,480

UNITED STATES PATENT OFFICE 2,010,480

PROCESS FOR COLORING HARDENED MASSES MADE FROM CASEIN AND OTHER PROTEIN SUBSTANCES

Henri Dumont, Hamburg, Germany, assignor to firm Internationale Galalith-Gesellschaft Hoff & Co., Harburg-Wilhelmsburg (Elbe), Germany No Drawing. Application June 29, 1931, Serial No. 547,798. In Germany September 2, 1930

2 Claims. (Cl. 8—5)

It has hitherto not been possible to color casein artificial horn made of casein and other protein substances and of material rich in protein matter, such as yeast and the like, by kneading under pressure the moistened starting material into a plastic mass and subsequently hardening the same in a formaldehyde bath. The coloring materials proper are fixed from the solution on the surface of the material. When only thin layers are rubbed off, and consequently when the superficially colored articles of casein artificial horn and the like are used, the color disappears more and more until soon quite colorless spots appear. In order to produce casein artificial horn, moistened casein is kneaded with or without the addition of coloring and filling materials subjected to heat and high pressure, the resulting plastic mass is pressed into rods, plates and molded articles and then hardened and dried by remaining in the formaldehyde bath for some time. Solutions of dyestuffs do not penetrate into the finally hardened artificial horn produced in the said usual or a similar manner so that it is impossible to subsequently color or recolor hardened artificial horn throughout the mass by using solutions of dyestuffs.

The present invention consists of a process of subsequently coloring or re-coloring finally hardened casein artificial horn. Solutions of soluble heavy metal salts serve as coloring agents which are adapted to penetrate into and throughout the artificial horn. The solutions of such heavy metal salts, which have a natural color, such as copper salts, chromium salts, uranium salts, cobalt mercury thiocyanate, impart to the hardened casein artificial horn a coloring similar to the natural coloring; the solutions of other heavy metal salts such as mercuric nitrate allow of a coloring effect being produced by reaction with the casein.

Extremely satisfactory utilizable colorings are obtained by treating the hardened casein artificial horn by means of solutions of complex compounds of the heavy metal salts such as copper pounds of the heavy metal salts such as copper oxide ammonia, cobaltammine (cobaltiac) and the like, also such which contain inorganic and organic elements such as acetate and carbonate residues.

A special modification of the invention resides in producing the coloring of the hardened casein artificial horn by a reaction therein.

A special method of carrying out the present process consists in first of all treating the hardened material with a metal salt solution and then subjecting it to the action of a chemically reacting substance in gas or bath form, whereby the colorings are formed or changed owing to the chemical reaction. Particularly ammonium sulphide, hydrogen sulphide and the like come into consideration for such after-treatment.

In these various modifications, the solutions adapted for coloring the hardened artificial horn penetrate into the latter; in special cases, the cooperation of electrolytes may be resorted to for accelerating the penetration of the solutions. The electrolytes may be added to the solution but they may also be mixed with the casein when producing the casein mass.

Not only can uniformly colored pieces be made in the said manner, but marbled pieces as well. The solution acts differently on the differently colored parts in the marbled masses so that a marbled mass is again formed.

In general the transparency of the hardened masses treated according to the present process is completely retained.

The present process is of particular economic advantage owing to the fact that the stock of differently colored masses may be substantially lessened, since definite colorings may be executed at any time according to the present process readily and without great cost. Not only plates and rods but blocks and shaped articles also may be thoroughly colored according to this process. The new process also offers a further particular technical advantage owing to the fact that when treated with thoroughly coloring solutions the finished product is less water attractive than the masses colored in the hitherto known manner.

I claim:

1. A process of thoroughly coloring hardened casein, artificial horn consisting in treating the hardened artificial horn with aqueous solutions of heavy metal salts.

2. A process according to claim 1, in which is used complex salts of the heavy metals for thoroughly coloring the artificial horn.

HENRI DUMONT.